United States Patent [19]

Miyake et al.

[11] 4,086,619

[45] Apr. 25, 1978

[54] SPECIAL IMAGE EFFECT PRODUCING APPARATUS

[75] Inventors: Kazuhiko Miyake; Bunkichi Yamada, both of Kawasaki, Japan

[73] Assignee: Tokyo Shibaura Electric Co., Ltd., Kawasaki, Japan

[21] Appl. No.: 781,516

[22] Filed: Mar. 25, 1977

[30] Foreign Application Priority Data

Mar. 31, 1976 Japan .................................. 51-34410

[51] Int. Cl.² .......................... H04N 5/22; G11C 11/02
[52] U.S. Cl. ........................................ 358/183; 365/94
[58] Field of Search ................. 358/22, 160, 181–183, 358/185; 340/173 LM, 174 SP, 172.5

[56] References Cited

U.S. PATENT DOCUMENTS

| | | | |
|---|---|---|---|
| 3,742,125 | 6/1973 | Siegel | 358/183 X |
| 3,821,468 | 6/1974 | Busch | 358/183 |
| 3,944,731 | 3/1976 | Busch | 358/183 |
| 3,978,328 | 8/1976 | Farby et al. | 340/172.5 X |

*Primary Examiner*—John C. Martin
*Assistant Examiner*—Aristotelis M. Psitos
*Attorney, Agent, or Firm*—Cushman, Darby & Cushman

[57] ABSTRACT

A control panel is used onto which a block is mounted having a region with a pattern for indicating a kind of special image effects and regions containing discriminating information for a first and second special image effects corresponding to the pattern. A detecting means is also included which detects a desired discriminating information of the block and produces a code signal corresponding to the desired discriminating information. A video signal producing means produces a video signal having the special image effect corresponding to the code signal when it receives the code signal.

7 Claims, 4 Drawing Figures

SPECIAL IMAGE EFFECT PRODUCING APPARATUS

The present invention relates to a special image effect producing apparatus in which a plurality of video signals are synthesized to form a video signal having a special effect.

A special image effect producing apparatus provided at the television transmitter is well known by which a first and second images, for example, a dark picture and a luminous picture, are formed on a television screen, and the dark picture expands gradually in a predetermined direction to finally occupy the entire screen. There are many kinds of special image effects. First, the dark picture initially appears at one of the corners of the screen to gradually expand over the entire screen. Second, the dark picture initially appears at the upper or lower side of the screen to gradually grow to finally cover the remaining area of the screen. Third, the dark picture initially appeared at the right side or left side gradually grows towards the remaining area of the screen. Fourth, a circle dark picture appears at the center of the screen and gradually expands in the radial direction to finally occupy the entire screen. This is called a circular wipe. Thus, there are various kinds of special image effects (hereinafter frequently referred as to special effect). And those special image effect producing techniques are well known. One of them is that horizontal and vertical fundamental waves for providing a desired special effect are generated, these fundamental waves are processed to produce a key signal, and under control of the key signal, two video signals, for example, are processed to produce a single video signal having a special image effect. For selecting a desired special effect from many ones, a fundamental wave selection signal must be applied to a fundamental wave selection circuit. One form of the fundamental wave selection signal supply is known having a number of switches corresponding to the respective special effects on the main control panel. In this method, one special effect corresponds to one switch so that number of the switches on the control panel is great and the control panel is large in size and the control is difficult.

Another form is that a number of blocks are used corresponding to special effects (a special effect being indicated on each block), and holes into which the blocks are inserted are formed to the control panel. In other words, the blocks corresponding to the special effects used in a television program are inserted correspondingly into holes, and the switches associated with the holes are depressed. In this method, a plurality of kinds of blocks may be inserted into a single hole so that the control panel may be small in size. However, one block must be used for one special effect, resulting in increase of number of the blocks.

Accordingly, an object of the present invention is to provide a special image effect producing apparatus in which a relatively small number of blocks may be used for specified number of special image effects and thus the control panel used is small in size.

According to the present invention, there is provided a special image effect producing apparatus comprising: blocks each having a pattern for indicating a kind of special image effects, and at least first and second discriminating regions, the first region including first information for a first special image effect, the second region including second information for a second special image effect, and both special image effects corresponding to the pattern; a control panel onto which the blocks are mounted; detecting means for detecting a desired discriminating information from the first or second discriminating regions and for producing a code signal corresponding to the detected discriminating information; and circuit means, upon receipt of the code signal, to produce the special image effect corresponding to the code signal.

With such a construction, a single block produces a plurality of code signals, and each code signal produces a single special image effect. Therefore, the blocks may be reduced in number and thus the control panel may be small in size.

Other objects and features of the present invention will be apparent from the following description taken in connection with the accompanying drawings, in which.

Figure 4:
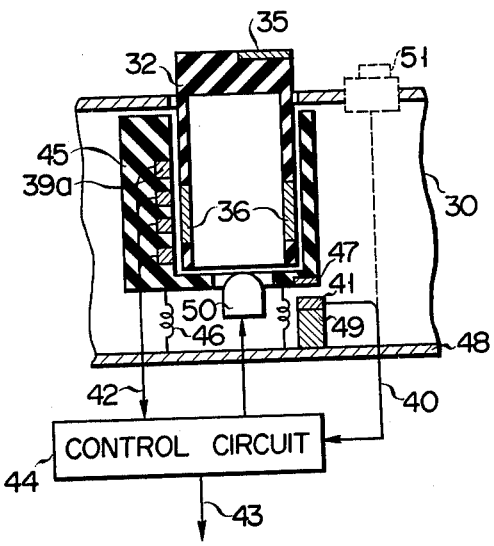
FIG. 4 shows in cross section of a detail of the detecting means used in the apparatus shown in FIG. 3.
Figure 6:
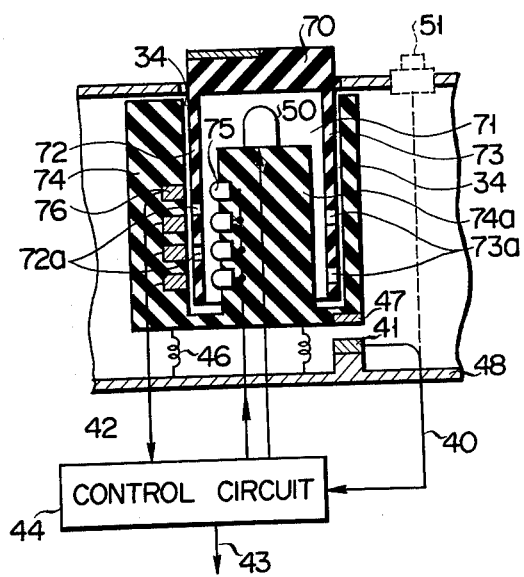
Figure 5:
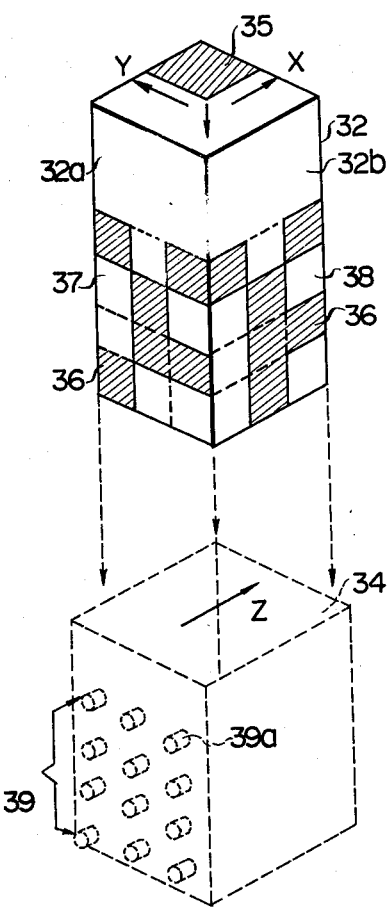
Figure 7:
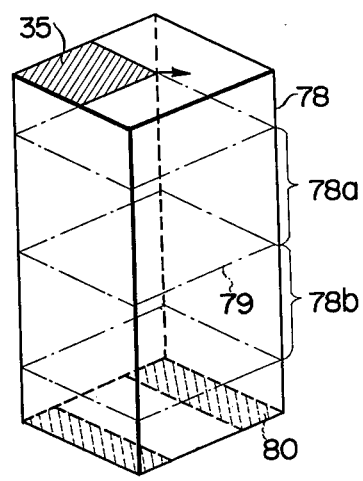

FIG. 5 perspectively shows a detail of the block and the detecting means shown in FIG. 4;

FIG. 6 shows in cross section a detail of another example of the detecting means; and FIG. 7 perspectively shows a modification of the block.

Some typical examples of a special image effect produced by a special image effect producing apparatus according to the present invention will be described with reference to FIG. 1. Such a special image effect is known as called a wipe or montage. As shown, each screen 1 has a first picture (referred to as a dark picture) $a$ shown by hatching and a second picture (referred to as a luminous picture) $b$ not hatched. In FIG. 1A, the dark picture $a$ first appears at the upper left corner of the screen 1 and gradually grows in the direction of an arrow 2 to finally occupy the entire screen 1. The dark images in FIGS. 1B to 1D first appear at the corner positions rotated clockwise by 90°, 180°, and 270° from that of FIG. 1A, respectively. The growth or expansion of these initial images is directed as indicated by arrows. In the case of FIG. 1E, the dark image 2a appears at the left side of the screen 1 to expand in the arrowed direction. The screen of FIG. 1F initially produces the dark image 2a at the upper side thereof to gradually expand it in the arrowed direction. FIG. 1G shows two initial dark images 4a, 5a on both right and left sides of the screen 1, these expanding directed to the center of the screen 1 as indicated by arrows. Two initial dark images 4a and 5a in FIG. 1H are disposed on the upper and lower sides of the screen 1, these likewise expanding to the center of the screen as indicated by arrows.

Figure 1:
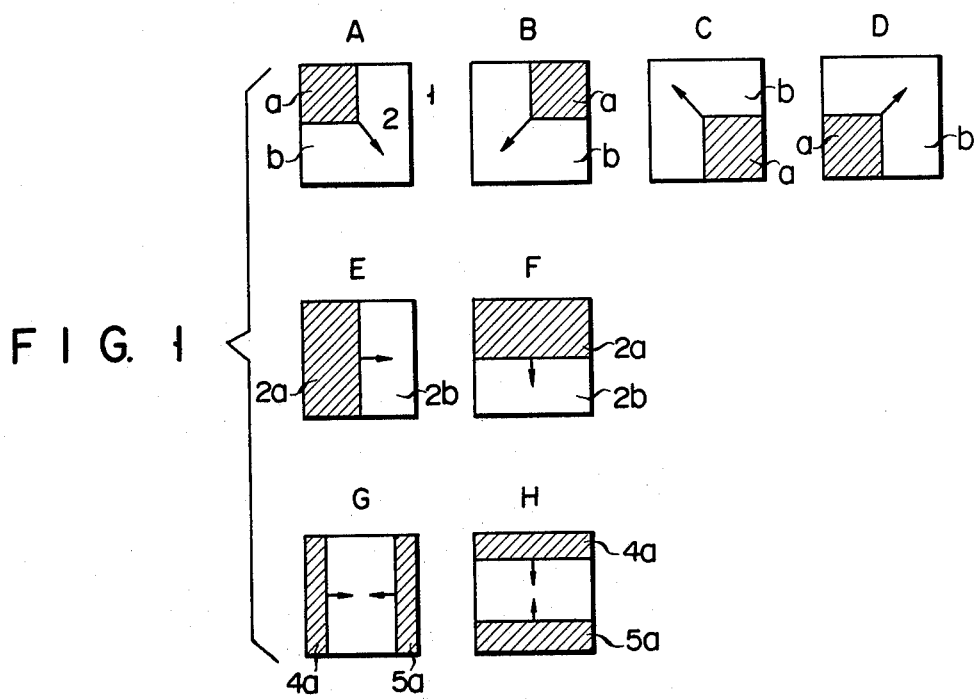
FIG. 1 shows some examples of the special image effects.
Figure 2:
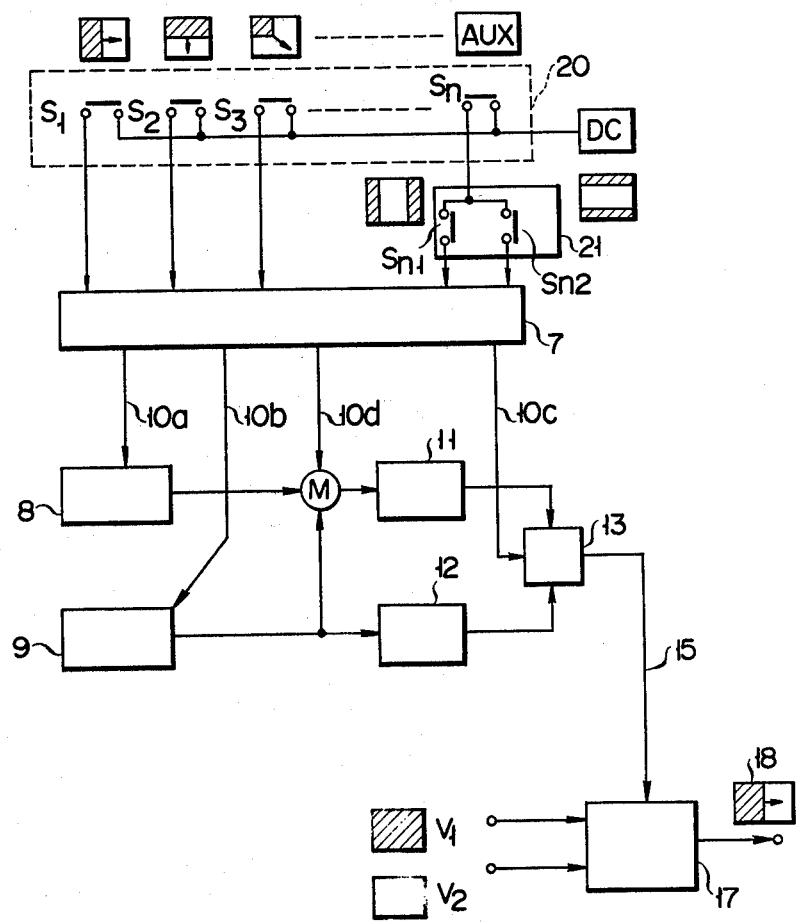
FIG. 2 is a block diagram of a conventional special image effect producing apparatus.

A conventional special image producing apparatus for producing the special image effects as shown in FIG. 1 will be first given referring to FIG. 2, for a better understanding of the present invention. A case of the FIG. 1E special image effect will be discussed by way of example. In this case, a switch S1 corresponding to such a special image effect is turned on. Upon the close of the switch S1, DC voltage from a DC supply is applied to the circuit corresponding to the switch S1 in a fundamental wave selection circuit 7. The selected signal from the fundamental wave selection circuit 7 is supplied to a horizontal fundamental wave generator 8 and a vertical fundamental wave generator 9, respectively. Therefore, the fundamental wave generators 8 and 9 produce fundamental waves whose waveforms provide the special image effect corresponding to the switch closed, for example, the switch S1. The horizontal fundamental wave generator 8 generates triangle waves, saw tooth waves, parabolic waves, each wave having a repeating period corresponding to one horizontal scanning period of the TV picture or one of these waves of which the period is $1/n$ of that of the former wave, where $n$ is integer. In other words, upon receipt of a control signal 10a, the generator 8 generates selectively a horizontal fundamental wave providing a desired special image effect. The vertical fundamental frequency generator 9 also generates likewise triangle waves, saw tooth waves, parabolic waves, each wave having a repeating period corresponding to one vertical scanning of the TV picture, or one of these waves whose period is $1/n$ of that of the former, where $n$ is integer. Upon receipt of a control signal 10b, the generator 9 generates selectively a vertical fundamental wave providing a desired special image effect.

The vertical and horizontal waves outputted from the respective generators 8 and 9 are supplied to slice circuits 11 and 12 where these fundamental waves are sliced at a predetermined level. The outputs of the slice circuits are fed to a signal synthesizing circuit 13 where these outputs are converted into a key signal 15 for forming a composite video signal to be described later, under control of a control signal 10c from the fundamental wave selection circuit 7. For the special image effects as shown in FIGS. 1A to H, the horizontal and vertical fundamental waves are not synthesized in a mixer M. In the case of a specified special image effect, for example, a circular wipe, those waves are mixed in the mixer M under the control of the control signal 10d from the fundamental wave selection circuit 7, and then sliced in the slice circuit 11 to produce the key signal. A special effect amplifier or video signal control circuit 17 is used for receiving exterior video signals corresponding to a dark picture V1 and exterior video signals corresponding to a luminous picture V2. By applying the key signal 15 to the amplifier 17, it produces the video signal for a desired special image effect such as the FIG. 1E effect here represented by numeral 18. The switches S2 to S3 are used to produce the corresponding special image effects as shown above the switches. In addition to a main control panel 20, an auxiliary control panel 21 is provided including a plurality of switches, for example, Sn1 and Sn2. A switch Sn included in the main control panel 20 is connected with one of the poles of those switches Sn1 and Sn2. The reason why such a construction is taken is that the special image effect infrequently used, for example, that of FIG. 1G, is related to the swtich, for example, Sn1, and when the image effect of FIG. 1G is desired, previously the switch Sn1 is closed and then the auxiliary switch Sn of the main control panel 20 is closed. In this way, the number of switches on the main control panel which are frequently operated is minimized. Similarly, with close of the switch Sn2 in place of Sn1, if the switch Sn is closed, the special image effect as shown in FIG. 1H is obtained.

An embodiment of the present invention will be described with reference to FIG. 3. As shown, a control panel 30 hatched is provided with a plurality of holes 34 into which blocks 31 to 3n (n is integer) which is square in cross section are inserted. FIG. 4 illustrates in cross section the block 32 inserted in one of the holes 34. The block and the hole also are in perspective form illustrated in FIG. 5. On the top surface of the block 32, there is shown a pattern 35 for indicating the special image effects corresponding to FIGS. 1A, B, C and D. On the first side surface 32a, is provided a discriminating information region including discriminating information 37 for selecting the special image effect corresponding to the FIG. 1A. Another descriminating information region including discriminating information 38 for selecting the special image effect corresponding to the FIG. 1B is provided to the second surface 32b. The same thing is true in the third and fourth side surfaces (not shown) for selecting the special image effects corresponding to FIGS. 1C and 1D. These discriminating information regions are each comprised of 12 subregions. On selected subregions magnets 36 hatched are disposed.

A detector 39 comprising 12 magnetic detecting elements 39a is provided on one of the side walls of the block insertion hole 34. The individual magnetic detecting elements 39a are disposed to correspond to the individual subregions, when the block is inserted into the insertion hole 34, so that the magnetic detecting element 39a magnetically detects the information from the corresponding discriminating information region to produce a code signal. When the special image effect shown in FIG. 1A is desired, the block 32 is inserted into the block insertion hole 34 in such a manner that an arrow X on the top surface of the block 32 coincides with an arrow Z in the block insertion hole 34. With such an insertion of the block, the detector 39 detects the discriminating information 37 formed on the side surface 32a corresponding to the special image effect of FIG. 1A.

When the special image effect shown in FIG. 1B is desired, the block 32 rotated by 90° clockwise is inserted into the hole 34 in such a way that an arrow Y on the top surface of the block 32 coincides with the arrow Z in the block insertion hole 34. In this case, the detector 39 detects the discriminating information 38 formed on the side surface 32b corresponding to the special image effect shown in FIG. 1B. For the special image effects of FIGS. 1C and D, the block further rotated clockwise is inserted into the hole 34.

Other block insertion holes 34 of the control panel 30 receive blocks 31 and 3n which have patterns indicating special image effects different from those of FIGS. 1A, B, C and D, and include corresponding discriminating information formed on the side walls.

Figure 3:
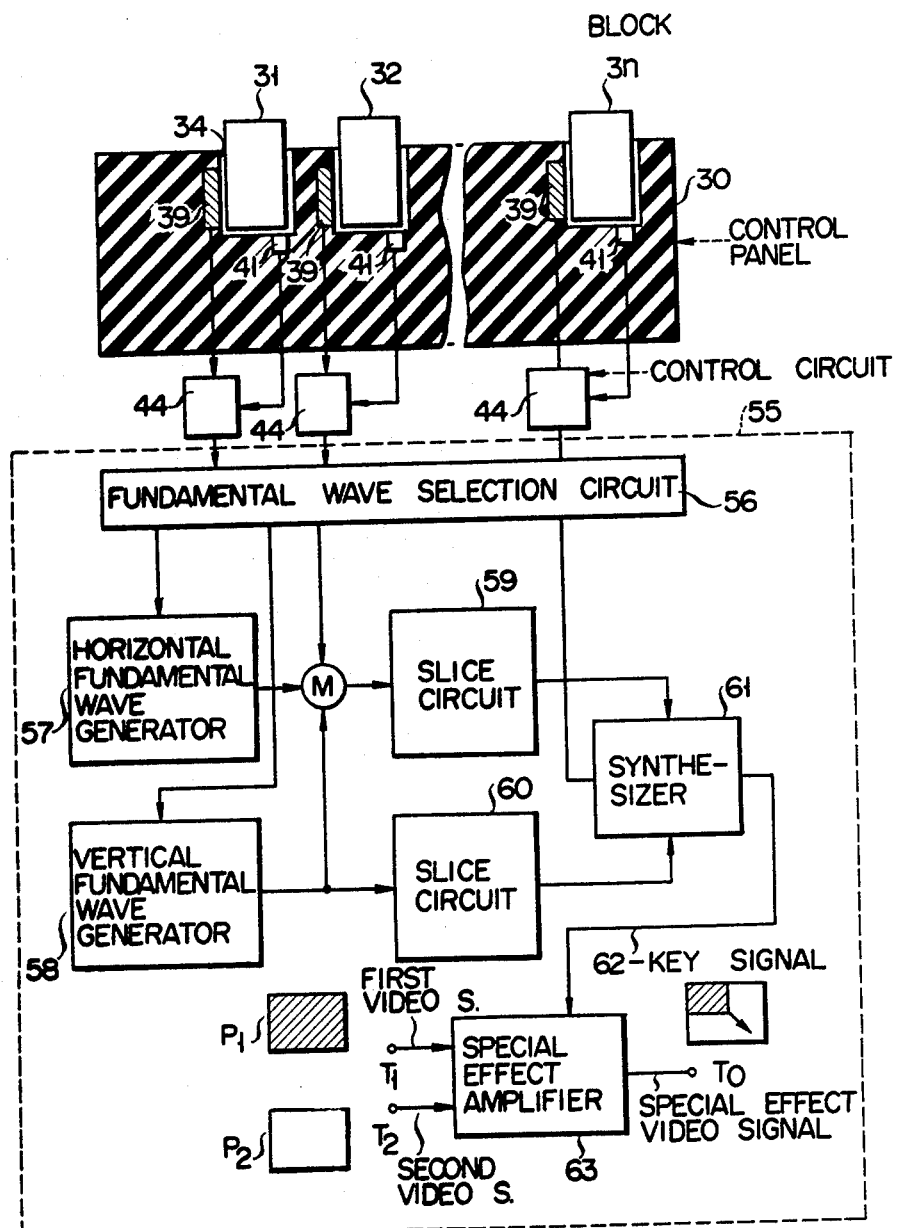
FIG. 3 is a block diagram of a special image effect producing apparatus of an embodiment of the present invention.

When the special image effect as shown in FIG. 1A is desired under the condition that the blocks are inserted into the block insertion holes as shown in FIG. 3, the block 32 whose arrow X coincides with the arrow Z is depressed. The output codes signals including 12 bits from the detector 39 (FIG. 5) is applied to a control circuit 44 as shown in FIG. 4. A frame 45 forming the insertion holes is supported by springs 46. The frame 45 is provided at the lower portion with a magnet 47. A projection 49 having a magnetic switch 41 at the top is provided on a bottom plate 48 partly forming the control panel. With this construction, when the block 32 is depressed, the signal 40 from the magnetic switch 41 is supplied to a control circuit 44. Upon receipt of the signal 40, the control circuit 44 produces a signal to light a lamp 50 to illuminate the pattern 35 of the block 32. The control signal 40 may be supplied by using a switch 51 indicated by dotted line. The signal 43 from the control circuit 44 is fed to a fundamental wave selection circuit 56 to be described later.

A circuit means 55 for producing a special image effect is principally equal to that referred to in FIG. 2. As shown in FIG. 3, the fundamental wave selection circuit 56 acts to select fundamental waves to be produced from a horizontal and vertical fundamental wave generators 57 and 58 and also to control a mixer M and a synthesizer circuit 61. The selected fundamental waves are sliced in slice circuits 59 and 60 at a predetermined level respectively to be supplied to a synthesizer circuit. A key signal from the synthesizer circuit 61 is applied to a special effect amplifier 63. Video signals of the dark picture P1 and of the luminous picture P2 are applied to the amplifier 63 through terminals T1 and T2. The amplifier 63, under the control of the key signal 62, produces at the output terminal To a video signal having the special effect corresponding to the FIG. 1A.

From the foregoing description, it will be understood that various kinds of special effects may be attained merely by inserting a single block into a block insertion hole by changing the inserting direction of the block. This means that the blocks used for a predetermined number of special image effects are reduced in number. Moreover, since different kinds of blocks may be inserted in an identical hole, the number of the insertion holes may be reduced and thus the control panel may be small in size.

While, in the above-mentioned embodiment, the descriminating information are attached onto only the side walls 32a and 32b of the block 32 (FIG. 5), the discriminating information corresponding to the special effects of FIGS. 1D and C may be attached onto the remaining two side walls. In this case, four special effects of FIGS. 1A to D for a single pattern may be produced by a single block. The special image effects corresponding to FIGS. 1E and F and FIGS. 1G and H, may be obtained merely by inserting respective single patterned block turned its direction into a hole.

Referring now to FIG. 6, there is shown a modification of the detector. As shown, a block 70 rectangular in cross section has a hollow 71. One 72 of the side walls of the hollow 71 includes perforations 72a whose number and disposition correspond to the first special image effect, while the other 73 includes perforations 73a whose number and disposition correspond to the second special image effect. A frame 74 having block insertion holes 34 includes a projection 74a with a lamp 50 at the top. The projection 74a is provided at the left side as viewed in the drawing with a plurality of, e.g. 12, light emission diodes 75 arranged corresponding to the perforation area of the block when the block is inserted. On the left side wall of the frame 74, are arranged 12 light receiving elements 76, for example, photodiodes, correspondingly in opposition to the light emission diodes 75. The signal 40 produced when the block 70 is depressed is applied to the control circuit 44 so that the light emission diodes 75 and the lamp 50 are lit. And at the same time, a coded signal 42 of 12 bits corresponding to the pattern of the perforations 72a arranged is applied to the control circuit 44. When the side wall 73 is disposed between the light emission diodes and the photodiode, the pattern of the perforations 73a arranged defines the code signal to be supplied to the control circuit 44.

It should be noted that, in the examples of FIGS. 4 and 6, the discriminating information corresponding to a single special image effect is provided on a single surface; however, a single discriminating information may be provided on two surfaces opposite to each other. In the case of the block having a symmetrical special image effect as shown in FIG. 1G, even if the block is turned by 180°, the same special image effect is displayed so that this case permits the same discriminating information to be disposed on both the side surfaces of the block opposite to each other.

The case to follow referring to FIG. 7 is that different two patterns each indicating a kind of special image effects are formed on a single block. As shown in FIG. 7, a first discriminating section 78a is located above a line 79 bisecting the block 78 square in cross section and a second discriminating section 78b is located below the bisectional line 79. The pattern 35 corresponding to the special effect of FIG. 1A is formed on the top surface of the block while the pattern 80 on the bottom surface of the block, the pattern 80 corresponding to the FIG. 1G. The discriminating information providing the special image effects of FIGS. 1A to D are formed on the respective side surfaces of the first discriminating section 78a, and the discriminating information for giving the special image effects of the FIGS. 1G to H are formed on the respective side surfaces of the second discriminating section 78b. In this case, one of the side walls of the frame into which the block 78 is inserted must have a detector disposed on a position where a desired discriminating information of the block is detected when the block is inserted with the pattern disposed at the upper.

It should be understood that the block is not limited to the rectangular in cross section, so far as the cross section of the block coincides with that thereof when the block is turned by 90°, 180° and 270°. When the cross sections does not coincide, the configuration of the cross section of the block insertion hole must be such that the block may be inserted into the hole irrespective of the direction of the block.

As matter of course, the circuit means for producing the special image effect is not limited to those shown in the figures.

What is claimed is:

1. A special image effect producing apparatus comprising:
   blocks each having a pattern for indicating a kind of special image effects, and at least a first and second discriminating regions, said first region including first information for a first special image effect, said second region including second information for a second special image effect, and both special image effects corresponding to said pattern;
   a control panel onto which said blocks are mounted;
   detecting means for detecting a desired discriminating information from said first or second discriminating region and for producing a code signal corresponding to the detected discriminating information; and,
   circuit means, upon receipt of said code signal, to produce the special image effect corresponding to said code signal.

2. A special image effect producing apparatus according to claim 1, in which said block is a rod like member having at least three side surfaces; said first and second discriminating regions are formed on the first and second side surfaces of said rod like member respectively; said control panel includes a plurality of holes into which said blocks are inserted; said detecting means is provided on one of side surfaces of each hole to detect information on a desired discriminating region of said block when said block is inserted into said hole so that said desired discriminating region faces to said side surface thereby producing a code signal corresponding to said desired discriminating region.

3. A special image effect producing apparatus according to claim 2, in which said discriminating regions each include a plurality of subregions of magnetic material; said detecting means includes a plurality of magnetic detecting elements, only the magnetic detecting elements disposed correspondingly opposite to said subregions including said magnetic material producing a signal.

4. A special image effect producing apparatus according to claim 2, in which said pattern indicating a kind of special image effects is arranged on said rod like member and said detecting means further includes light emitting diode which detects the insertion of said rod like member into said hole of said control panel and illuminates said pattern.

5. A special image effect producing apparatus according to claim 2, in which said respective discriminating regions of said rod like member are provided with a plurality of perforations; said detecting means includes a plurality of light receiving elements disposed on one of said walls of said rod like member insertion hole and a plurality of light emitting elements disposed in said hole correspondingly opposite to said light receiving elements, and produces a detected code signal of a desired discriminating region when a desired discriminating region of said rod like member is brought between said light emitting elements and said light receiving elements.

6. A special image effect producing apparatus according to claim 1, in which said block is a rod like member having at least three side surfaces; a first and second surfaces normal to the axis of said rod like member include a first and second different patterns, respectively, the side surfaces of said rod like member close to said first surface includes said first and second discriminating regions corresponding to said first pattern and the side surfaces close to said second surface include said second discriminating regions corresponding to said second pattern; said control panel includes a plurality of holes into which said rod like members are inserted; said detecting means includes a plurality of detecting elements disposed on a inner wall of said insertion hole, and produces said code signal corresponding to a desired discriminating region when the desired discriminating region is faced to said detecting elements.

7. A special image effect producing apparatus according to claim 1, comprising fundamental wave selection circuit for selecting respective horizontal and vertical fundamental waves for forming a special image effect corresponding to said code signal supplied from said detecting means; a signal processing circuit for generating the vertical and horizontal fundamental waves selected by the output of said fundamental wave selection circuit, and for converting the fundamental waves selected into a key signal for controlling a video signal; and a video signal control circuit for controlling two video signals from exterior when said key signal is supplied to produce a video signal giving a desired special image effect.

* * * * *